(12) United States Patent
Yoon (10) Patent No.: US 12,292,322 B2
(45) Date of Patent: May 6, 2025

(54) LEVEL INDICATING DEVICE FOR TANK

(71) Applicant: KEPCO ENGINEERING & CONSTRUCTION COMPANY, INC., Gyeongsangbuk-do (KR)

(72) Inventor: Chang Sun Yoon, Seoul (KR)

(73) Assignee: KEPCO ENGINEERING & CONSTRUCTION COMPANY, INC., Gimcheon-si (KR)

( * ) Notice: Subject to any disclaimer, the term of this patent is extended or adjusted under 35 U.S.C. 154(b) by 854 days.

(21) Appl. No.: 17/490,779

(22) Filed: Sep. 30, 2021

(65) Prior Publication Data

US 2023/0112119 A1    Apr. 13, 2023

(51) Int. Cl.
*G01F 23/16*    (2006.01)
*G01F 23/80*    (2022.01)

(52) U.S. Cl.
CPC .............. *G01F 23/16* (2013.01); *G01F 23/80* (2022.01)

(58) Field of Classification Search
CPC ................................. G01F 23/16; G01F 23/80
USPC ............................. 73/290 R, 290 V, 313, 323
See application file for complete search history.

(56) References Cited

U.S. PATENT DOCUMENTS

| | | | | |
|---|---|---|---|---|
| 2,550,175 A | * | 4/1951 | Van Ham | G01F 23/02 73/323 |
| 5,146,783 A | * | 9/1992 | Jansche | G01F 23/168 73/302 |
| 5,406,303 A | * | 4/1995 | Salmon | G01R 7/08 362/489 |
| 10,234,326 B2 | | 3/2019 | Kwon et al. | |
| 2004/0261688 A1 | * | 12/2004 | MacGregor | F03G 7/065 116/284 |
| 2008/0211652 A1 | * | 9/2008 | Cope | B60K 35/00 340/461 |
| 2009/0174682 A1 | * | 7/2009 | Bowden | B60K 35/10 345/173 |
| 2015/0300867 A1 | * | 10/2015 | Diaz | G01F 23/2921 73/290 R |
| 2018/0128669 A1 | * | 5/2018 | Kwon | G01F 23/02 |
| 2019/0195672 A1 | * | 6/2019 | Boldt | F16J 15/004 |
| 2023/0228609 A1 | * | 7/2023 | Fitch | F16K 37/0058 285/125.1 |

FOREIGN PATENT DOCUMENTS

| | | |
|---|---|---|
| JP | S61-017022 A | 1/1986 |
| JP | 2013-246061 A | 12/2013 |
| KR | 2015-0094356 A | 8/2015 |
| KR | 2018-0050963 | 5/2018 |

OTHER PUBLICATIONS

Korean Office Action (App. No. 10-2020-0090565); Mailed Dec. 2, 2021 (10 pages).

* cited by examiner

*Primary Examiner* — Alexander A Mercado
*Assistant Examiner* — Rodney T Frank
(74) *Attorney, Agent, or Firm* — NIXON PEABODY LLP; Jeffrey L. Costellia (57) ABSTRACT

A level indicating device for a tank includes: a differential pressure type level gauge configured to measure a level of a fluid in a tank on the basis of a pressure according to the level of the fluid in the tank; and a level indicator configured to indicate the level of the fluid by moving in a vertical direction according to a differential pressure signal measured by the differential pressure type level gauge.

5 Claims, 6 Drawing Sheets

LEVEL INDICATING DEVICE FOR TANK

BACKGROUND

1. Field

The disclosure relates to a level indicating device for a tank, and more particularly, to a level indicating device for a tank, the level indicating device enabling an operator to conveniently check the level of a fluid in a tank via a level indicator that moves in a vertical direction according to a differential pressure signal measured by a differential pressure type level gauge.

2. Description of the Related Art

A tank containing a fluid is used in a power plant process, and it is very important to accurately measure the level of the fluid in the tank for a normal operation.

Figure 1:
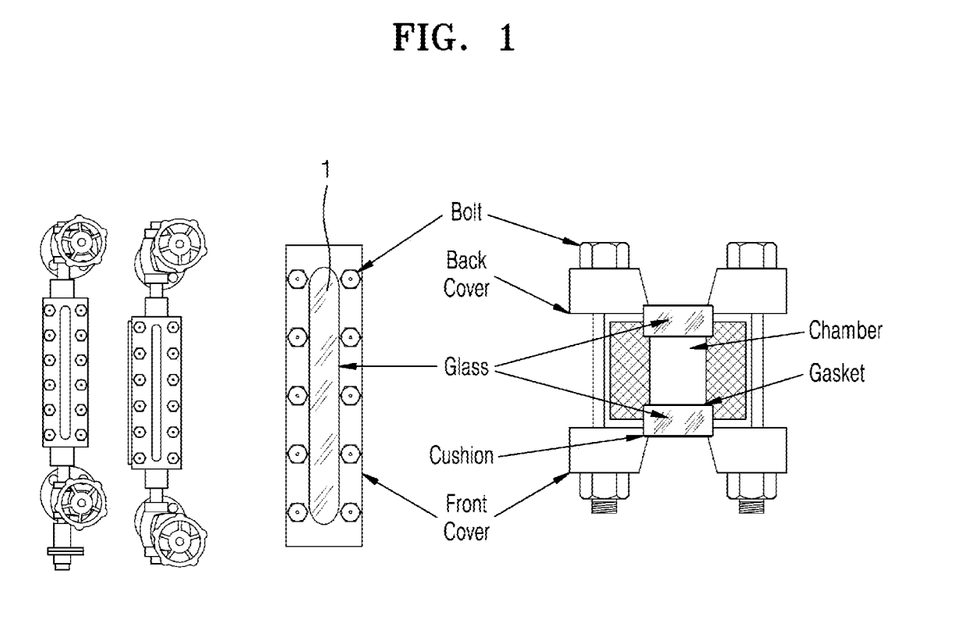
FIG. 1 is a view of a reflection type level measurement device according to the related art.

As illustrated in FIG. 1, a balanced reflection type device or a balanced glass type device to directly check the level of a fluid through a transparent observation part 1 is used as a level indicator installed on site. However, this method is disadvantageous in that it is difficult to check the fluid level due to contamination of a glass part or interference with a steam part. Furthermore, it is not possible to use a level meter using glass or ultrasound to observe the level of a fluid in a high-temperature and high-pressure tank used in a power plant.

Figure 2:
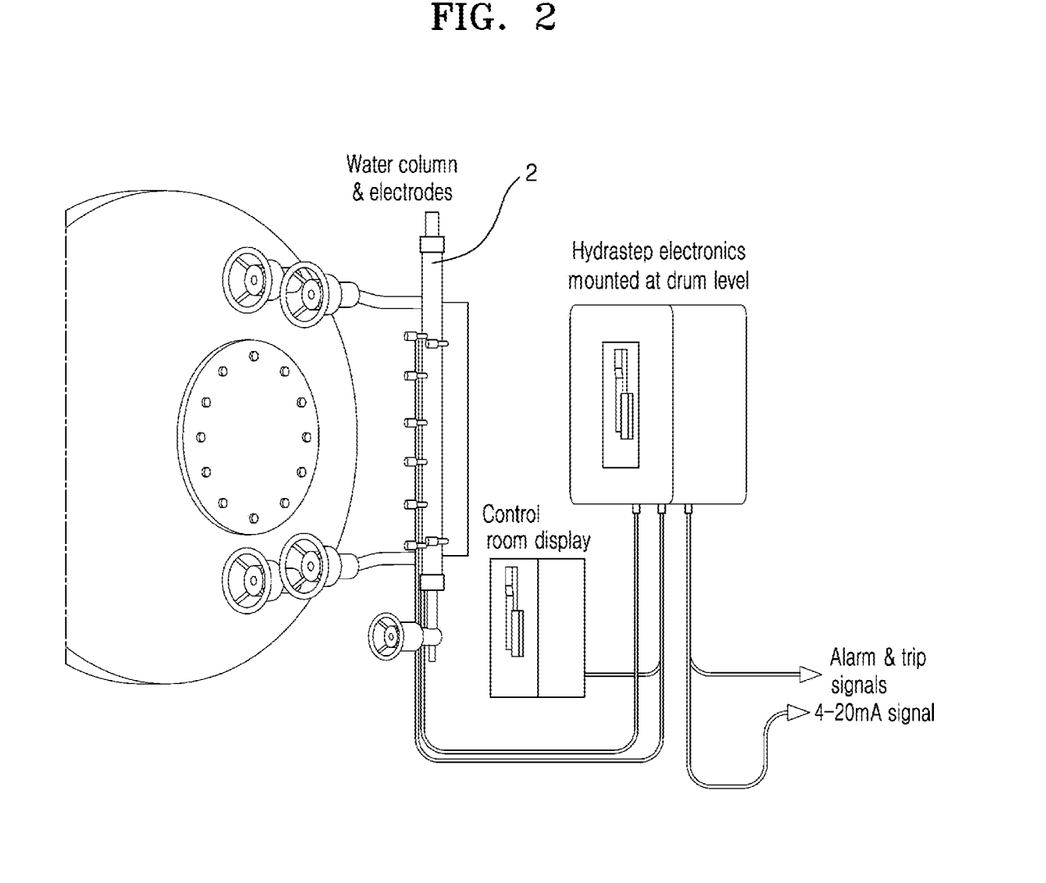
FIG. 2 is a view of a level measurement device having an electrode rod, according to the related art.

Furthermore, as illustrated in FIG. 2, a measuring method using a remote drum level indicator (RDLI) with an electrode rod 2 installed in a chamber may be used. However, since this method measures a level of a fluid on the principle of detecting the fluid level by installing several electrode rods in the chamber, it is difficult to accurately measure a continuous level change having linear characteristics, and the cost is very high.

SUMMARY

Provided is a level indicating device for a tank, the level indicating device enabling an operator to conveniently check the level of a fluid in a tank by using a level indicator moving in a vertical direction according to a differential pressure signal measured by a differential pressure type level gauge.

Additional aspects will be set forth in part in the description which follows and, in part, will be apparent from the description, or may be learned by practice of the presented embodiments of the disclosure.

According to an embodiment of the disclosure, a level indicating device for a tank includes a differential pressure type level gauge configured to measure a level of a fluid in the tank on the basis of a pressure according to the level of the fluid in the tank, and a level indicator configured to indicate the level of the fluid by moving in a vertical direction according to a differential pressure signal measured by the differential pressure type level gauge.

The level indicator may include a power supply portion configured to supply power according to the differential pressure signal, a power transmission portion configured to transmit the power via the power supply portion, a moving portion configured to receive the power from the power transmission portion and move to a position corresponding to the level of the fluid, and a beam irradiation portion coupled to the moving portion and configured to irradiate light to the level of the fluid.

The beam irradiation portion may be configured to irradiate a laser beam.

The power supply portion may include a first motor with an RPM that varies with the differential pressure signal, the power transmission portion includes a first upper pulley and a first lower pulley that are arranged spaced apart from each other in an upper end and a lower end, and a first rotation member wound around the first upper pulley and the first lower pulley and rotated by the first motor in one direction, and the moving portion is coupled to the first rotation member and moves in the vertical direction when the first rotation member is rotated.

The level indicating device for a tank may further include a cleaning device coupled to a front surface of the level indicator and cleaning the front surface of the level indicator, wherein the cleaning device includes a guide rod provided in the vertical direction, an elevation block coupled to the guide rod and moving in the vertical direction, a cleaning portion coupled to the elevation block and contacting and cleaning the front surface of the level indicator while the elevation block is moving up and down, and a driving portion configured to supply power to move the elevation block up and down.

The elevation block may be moved up and down in a preset certain time interval.

The level indicating device for a tank may further include a beam guide portion configured to adjust a range of irradiation of the light, wherein the beam guide portion includes a combining portion having an exit hole formed therein, from which the light exits, and coupled to a front surface of the beam irradiation portion, and a beam adjustment portion protruding from both edges of the combining portion and forming an adjustable angle with the combining portion.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the disclosure will be described with reference to the accompanying drawings. As the disclosure allows for various changes and numerous embodiments, particular embodiments will be illustrated in the drawings and described in detail in the written description. However, it should be understood that the disclosure is not limited to these particular embodiments but also includes various modifications, equivalents, and/or alternatives thereof. Throughout the specification and drawings, like reference numerals may be used to denote like elements or components.

When used herein, terms such as "comprise," "include," and "have" specify the presence of stated features (e.g., values, functions, operations, parts, elements, and components) but do not preclude the presence or addition of one or more other features. Furthermore, in the specification, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the specification, when a constituent element "connects" or is "connected" to another constituent element, the constituent element contacts or is connected to the other constituent element directly or through at least one of other constituent elements. Conversely, when a constituent element is described to "directly connect" or to be "directly connected" to another constituent element, the constituent element should be construed to be directly connected to another constituent element without any other constituent element interposed therebetween.

Terms used in the specification are used for explaining a specific embodiment, not for limiting the disclosure. Thus, the expression of singularity in the specification includes the expression of plurality unless clearly specified otherwise in context.

Unless defined otherwise, all terms used herein including technical or scientific terms have the same meanings as those generally understood by those of ordinary skill in the art to which the disclosure may pertain.

The terms as those defined in generally used dictionaries are construed to have meanings matching that in the context of related technology and, unless clearly defined otherwise, are not construed to be ideally or excessively formal.

Hereinafter, an embodiment of the disclosure is described in detail with reference to the accompanying drawings.

Figure 3:
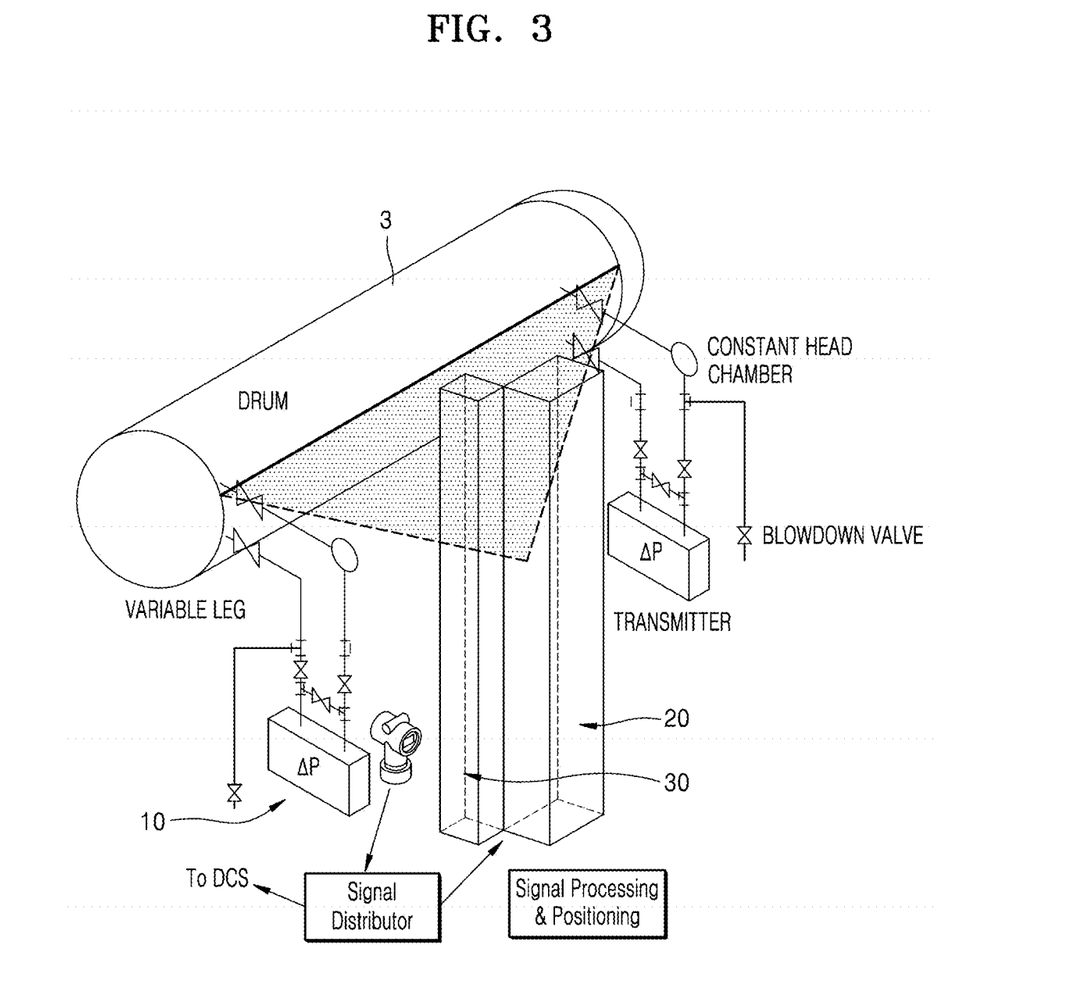
FIG. 3 is a schematic perspective view of a level indicating device for a tank, according to an embodiment of the disclosure.
Figure 4:
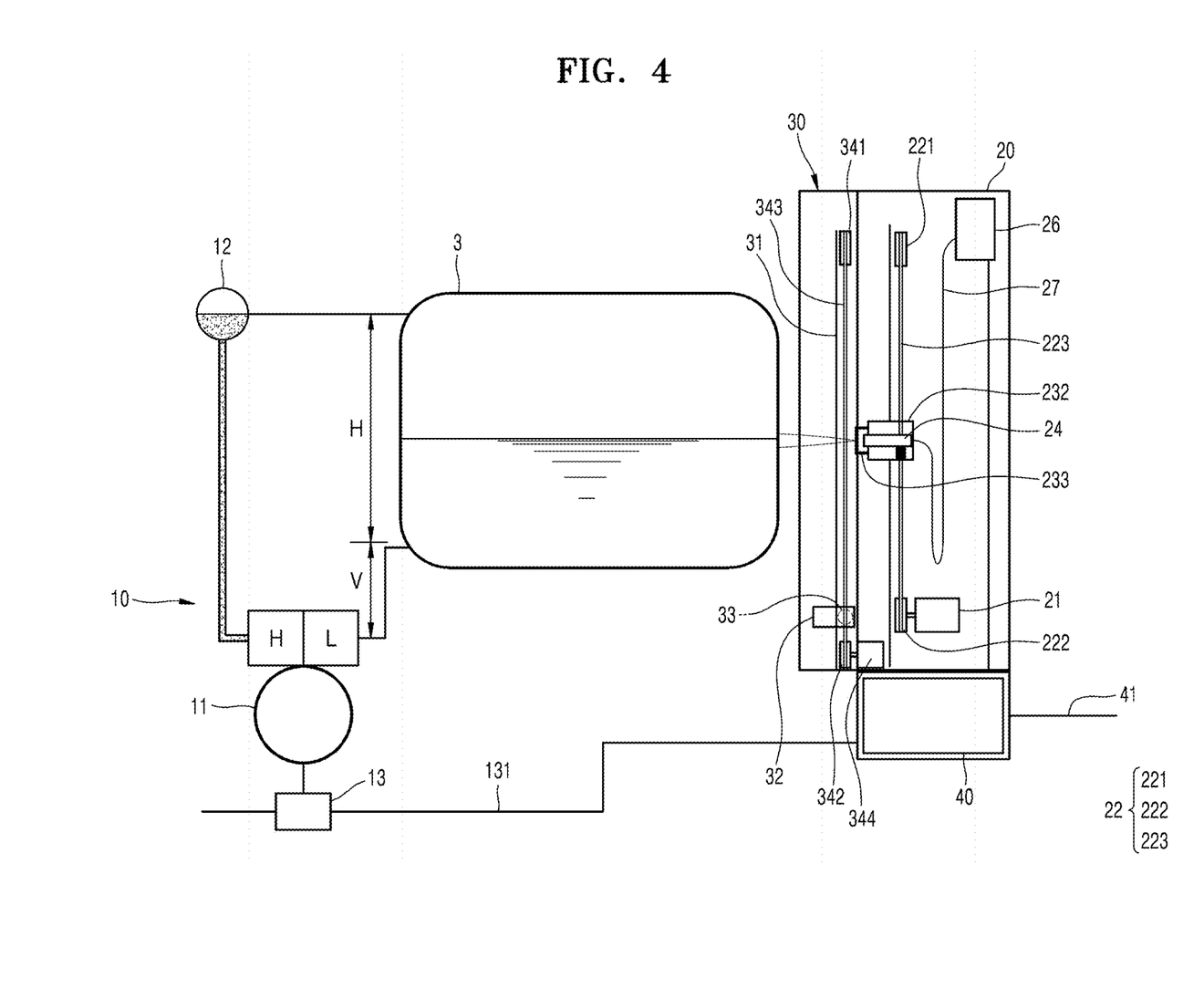
FIG. 4 is a schematic side view of the level indicating device for a tank of FIG. 3.
Figure 5:
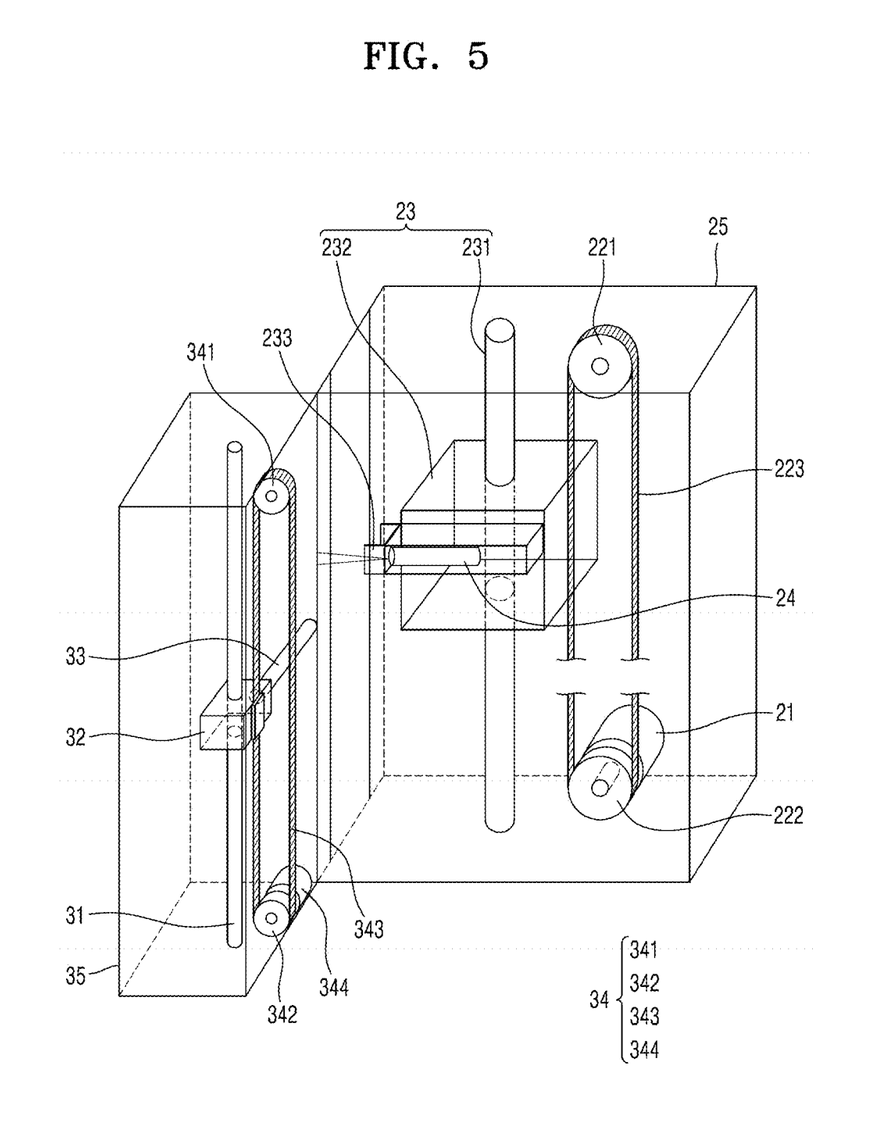
FIG. 5 is a schematic perspective view of a level indicator and a cleaning device.
Figure 6:
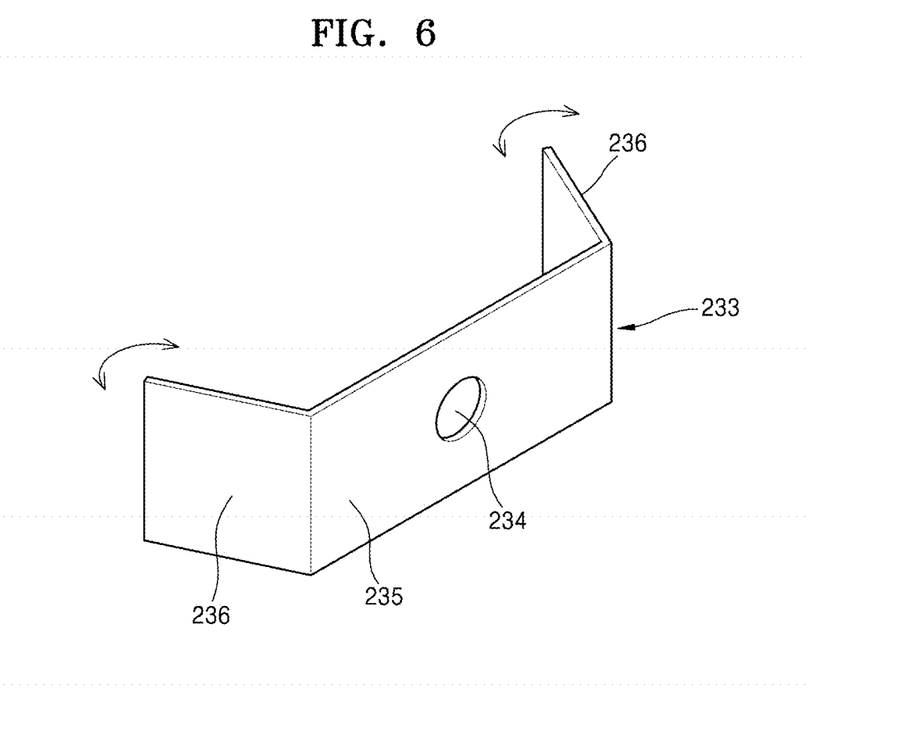
FIG. 6 is a perspective view of a beam guide portion.
Figure 7:
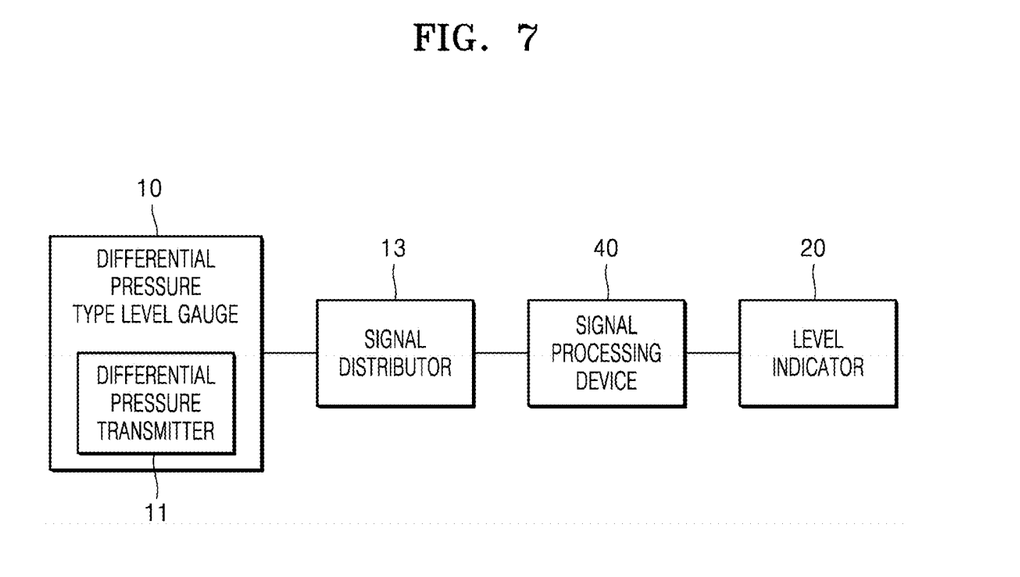
FIG. 7 is a block diagram of a process of transmitting a differential pressure signal to the level indicator.

FIG. 3 is a schematic perspective view of a level indicating device for a tank, according to an embodiment of the disclosure. FIG. 4 is a schematic side view of the level indicating device for a tank of FIG. 3. FIG. 5 is a schematic perspective view of a level indicator and a cleaning device. FIG. 6 is a perspective view of a beam guide portion. FIG. 7 is a block diagram of a process of transmitting a differential pressure signal to the level indicator.

As illustrated in FIG. 3, a level indicating device for a tank according to an embodiment of the disclosure may include a differential pressure type level gauge 10 and a level indicator 20.

The differential pressure type level gauge 10 is a device for measuring the level of a tank 3 containing a fluid, using a differential pressure according to the level of the containing fluid. According to an embodiment of the disclosure, the differential pressure type level gauge 10 may include a differential pressure transmitter 11 and a signal distributor 13.

The differential pressure may mean, as illustrated in FIG. 4, a pressure difference between the pressure of water condensed at a condensing port 12 and the water pressure in the tank 3, and a difference between two water heads is calculated by the differential pressure transmitter 11 and then converted into a differential pressure signal, for example, a current signal within a range of 4-20 mA. The difference between two water heads may mean a difference between the water level of the condensing port 12 and the water level of the tank 3. The differential pressure signal is distributed by the signal distributor 13. The signal distributor 13 transmits the differential pressure signal to a distributed control system (DCS) and a signal processing device 40.

The signal processing device 40 receives the differential pressure signal and generates a revolutions signal, such as RPM signal to adjust the RPM of a first motor according to the differential pressure signal. The level indicator 20 moves in a vertical direction to a height corresponding to the revolutions signal, such as the RPM signal. In detail, when the differential pressure signal is input to the signal processing device 40, the differential pressure signal is input to a control CPU through an analog/digital convertor, and the input signal is converted into the revolutions signal, such as the RPM signal for adjusting the RPM of the first motor. The revolutions signal, such as the RPM signal may be generated by using a compact computer such as a microcomputer, Arduino, Raspberry Pi, and the like, which is provided in the signal processing device 40. The signal processing device 40 receives power through an external power supply line 41, and the power supplied to the signal processing device 40 may also be provided for the operation of the level indicator 20 that is described below.

The level indicator 20 is provided to indicate the level of the fluid by moving in the vertical direction according to the differential pressure signal measured by the differential pressure type level gauge 10.

According to the present embodiment, the level indicator 20 may include a power supply portion 21, a power transmission portion 22, a moving portion 23, and a beam irradiation portion 24. The power supply portion 21, the power transmission portion 22, the moving portion 23, and the beam irradiation portion 24 are accommodated in a main body 25.

The power supply portion 21 supplies power according to the differential pressure signal. According to the present embodiment, the power supply portion 21 is the first motor with an RPM that varies with the differential pressure signal. As described above, the differential pressure signal is converted by the signal processing device 40 into a revolutions signal, such as RPM signal corresponding to the RPM of the first motor, and the first motor is operated according to the revolutions signal, such as the RPM signal.

For example, when the differential pressure signal is relatively large, which means a state in which the level of the tank 3 is lowered, the revolutions signal, such as the RPM signal is provided such that the RPM of the first motor is relatively small. Reversely, when the differential pressure signal is relatively small, which means that the level of the tank 3 is relatively high, the revolutions signal, such as the RPM signal is provided such that the RPM of the first motor is relatively large. A mechanism of providing the differential pressure signal as the revolutions signal, such as the RPM signal is preset such that the RPM of the first motor is linearly increased or decreased according to the differential pressure signal.

The power transmission portion 22 is provided to transmit power by the power supply portion 21. According to the present embodiment, the power transmission portion 22 may include a first upper pulley 221 provided in an upper end of the main body 25 of the level indicator 20, a first lower pulley 222 provided in a lower end of the main body 25 spaced apart from the first upper pulley 221, and a first rotation member 223 wound around the first upper pulley 221 and the first lower pulley 222 and rotated by the first motor in one direction.

The first lower pulley 222 is coupled to a rotation shaft of the first motor. The first lower pulley 222 receives rotation power of the first motor, and may be connected to a typical mechanical device, for example, a gear, a rack and pinion, and the like, for transmission of power. One end of the first rotation member 223 is wound around the first lower pulley 222. An outer circumferential surface of the first lower pulley 222 and the first upper pulley 221 may have a saw-toothed structure so that the first rotation member 223 is prevented from being decoupled from the first lower pulley 222. The first upper pulley 221 is provided in the upper end of the main body 25, and the other end of the first rotation member 223 is coupled to the first upper pulley 221. The first lower pulley 222 and a second upper pulley 341 are arranged spaced apart from each other in directions perpendicular to each other.

The moving portion 23 receives power from the power transmission portion 22 and moves to a position of the level of the fluid. According to the present embodiment, the moving portion 23 is coupled to the first rotation member 223 and moves together in the vertical direction when the first rotation member 223 rotates. In detail, according to the present embodiment, the moving portion 23 may include a moving block 232 and a guiderail 231.

The moving block 232 is coupled to the first rotation member 223 and moves with the first rotation member 223 in the vertical direction. According to the present embodiment, the moving block 232 is a hexahedral block having a through-hole in a vertical direction formed therein. The moving block 232 may include a relatively light plastic material considering the repetitive movement in the vertical direction. The shape and material of the moving block 232 are not limited thereto.

The guiderail 231 is provided to guide the moving block 232 when moving in the vertical direction. The guiderail 231 is arranged in the vertical direction with respect to the main body 25, and inserted into the through-hole formed in the moving block 232. Accordingly, the moving block 232 may be moved up and down in the vertical direction along the guiderail 231. Furthermore, the guiderail 231 having a rectangular cross-section prevents shake of the moving block 232 from being shaken by rotating in the left and right directions when moving up and down.

The beam irradiation portion 24 is coupled to the moving portion 23 to irradiate light to the level of the fluid. The beam irradiation portion 24 is coupled to one side of the moving portion 23 and moving up and down with the moving portion 23. When the first motor moves, according to the revolutions signal, such as the RPM signal, the moving portion 23 to a position corresponding to the level of the fluid contained in the tank 3, the beam irradiation portion 24 is moved with the moving portion 23 to the level of the fluid and irradiate light to the level.

According to the present embodiment, the beam irradiation portion 24 irradiates a laser beam. The beam irradiation portion 24 is connected to a laser module power device 26 provided in the main body 25 through a cable 27 and received power from laser module power device 26. The cable 27 may be provided not to interfere with the moving portion 23 when the moving portion 23 repeatedly moves up and down, and formed of a flexible material to an appropriate length to prevent disconnection even with repeated bending. The laser module power device 26 may be configured to be connected to the signal processing device 40 to receive external power.

According to the present embodiment, a beam guide portion 233 is provided to guide the laser beam to be irradiated in a range corresponding to an area of the tank 3 to observe the level. The beam guide portion 233 may include a combining portion 235 having an exit hole 234 formed therein, from which the laser beam exists, and coupled to the front surface of the beam irradiation portion 24, and a beam adjustment portion 236 protruding from both edges of the combining portion 235 and forming an adjustable angle with the combining portion 235. The beam adjustment portion 236 determines a range of irradiating the laser beam by adjusting a bending angle with respect to the combining portion 235.

The level indicating device for a tank according to the present embodiment may include a cleaning device 30.

The cleaning device 30 is coupled to the front surface of the level indicator 20 to clean the front surface of the level indicator 20. The front surface of the level indicator 20 is formed of a transparent material, and the cleaning device 30 removes contaminants on the front surface of the level indicator 20.

In detail, the cleaning device 30 may include a guide rod 31, an elevation block 32, a cleaning portion 33, and a driving portion 34. The guide rod 31, the elevation block 32, the cleaning portion 33, and the driving portion 34 are accommodated in an external case 35. According to the present embodiment, the external case 35 is arranged adjacent to the main body 25 of the level indicator 20.

The guide rod 31 is vertically provided at one side in the external case 35. The guide rod 31 may be fixed to upper and lower ends of the external case 35.

The elevation block 32 is coupled to the guide rod 31 to move in the vertical direction. An insertion hole into which the guide rod 31 is inserted is formed in the elevation block 32. The elevation block 32 moves vertically along the guide rod 31.

According to the present embodiment, the elevation block 32 has a hexahedral shape and is formed of a plastic material to reduce a load applied during repeated elevation. The shape and material of the elevation block 32 are not limited thereto.

The cleaning portion 33 is coupled to the elevation block 32 and provided to contact and clean the front surface of the level indicator 20 while the elevation block 32 is moving up and down. For example, the cleaning portion 33 is of a bar type extending in a horizontal direction with respect to the front surface, and when the front surface is formed of glass, the cleaning portion 33 may be formed of a soft material to enable cleaning of the glass.

The driving portion 34 supplies power to move the elevation block 32 up and down. According to the present embodiment, the driving portion 34 may include the second upper pulley 341, a second lower pulley 342, a second rotation member 343, and a second motor 344.

The second upper pulley 341 is provided in the inner upper end of the external case 35, and the second lower pulley 342 is provided in the inner lower end of the external case 35. The second rotation member 343 is wound around the second upper pulley 341 and the second lower pulley 342. The second lower pulley 342 is coupled to a rotation shaft of the second motor 344.

The circumferential surfaces of the second upper pulley 341 and the second lower pulley 342 may both have a saw-toothed structure, and the second rotation member 343 is engaged with the saw-toothed structure so that the second rotation member 343 is prevented from being decoupled from the second upper pulley 341 and the second lower pulley 342. The rotation shaft of the second motor 344 may be connected to the second lower pulley 342 through a separate power transmission device, for example, a gear, a rack and pinion, and the like.

According to the present embodiment, the elevation block 32 may move up and down in a preset certain time interval. An operation time of the second motor 344 may be set to be a certain time interval, and the elevation block 32 operates periodically to clean the front surface of the level indicator 20.

The level indicating device for a tank configured as above generates a differential pressure signal according to a differential pressure as the differential pressure type level gauge 10 measures a differential pressure according to the level of the tank 3, and the differential pressure signal is provided to the signal processing device 40 to generate the revolutions signal, such as the RPM signal of a motor according to the differential pressure signal. The level indicator 20 moves up and down based on the revolutions signal, such as the RPM signal, and the beam irradiation portion 24 accurately irradiates a laser beam to a position corresponding to the level of the tank 3.

As such, according to the level indicating device for a tank according to the disclosure, an operator may intuitively check the level of the tank 3 using the level indicator 20 that moves in the vertical direction according to the differential pressure signal measured by the differential pressure type level gauge 10. Furthermore, as the level indicator 20 is capable of moving in the vertical direction by following the level of the tank 3, the level of the tank 3 may be continuously observed.

The level indicating device for a tank according to the disclosure enables an operator to conveniently check the level of a tank, using the level indicator that moves in the vertical direction according to the differential pressure signal measured by the differential pressure type level gauge.

Furthermore, as the beam irradiation portion has an effect of checking the level of, for example, a transparent tank by irradiating a laser beam to the tank, intuitive level reading is possible compared to any method according to the related art.

Furthermore, although the level measurement device according to the related art installed on site requires a user to be positioned in front of the front surface of the level measurement device to check the level, according to the disclosure, as a laser beam is irradiated, the level may be checked at every places where a laser beam is irradiated or at a remote place.

Furthermore, in the level measurement device according to the related art, such as, a glass type, a reflection type, and the like, it is unable to check the level in night or in a dark environment. However, according to the disclosure, by using a laser beam, the level may be read even at night, in a dark environment, or outdoors.

Furthermore, in the level measurement device according to the related art, such as, a glass type, a reflection type, and the like, when dust or foreign materials adhere on an observation window, it is difficult to read the level. However, as the level indicating device for a tank according to the disclosure includes the cleaning device that periodically cleans the front surface of the level indicator, a laser beam may be smoothly projected so that accurately level measurement is possible.

Furthermore, as the level measurement device with electrode rods according to related art measures the level on the principle of detecting the level by using several electrode rods installed in the chamber, it is difficult to measure a continuous level change. However, according to the disclosure, a continuous level change may be detected using a differential pressure type level measurement principle.

Furthermore, as the level indicating device for a tank according to the disclosure may be manufactured at a lower cost than the level measurement device with electrode rods according to related art, the level indicating device for a tank according to the disclosure has very high economic efficiency.

Furthermore, as the level indicating device for a tank according to the disclosure is applicable to tanks having various shapes such as a circle, a sphere, an oval, a rectangle, and the like, the level indicating device for a tank according to the disclosure is very useful as a tank level indicator on site.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A level indicating device for a tank, the level indicating device comprising:
   a differential pressure type level gauge configured to measure a level of a fluid in the tank on the basis of a pressure according to the level of the fluid in the tank; and
   a level indicator configured to indicate the level of the fluid by moving in a vertical direction according to a differential pressure signal measured by the differential pressure type level gauge,
   wherein the level indicator comprises:
      a power supply portion configured to supply power according to the differential pressure signal;
      a power transmission portion configured to transmit the power via the power supply portion;
      a moving portion configured to receive the power from the power transmission portion and move to a position corresponding to the level of the fluid; and
      a beam irradiation portion coupled to the moving portion and configured to irradiate light to the level of the fluid, and
   wherein the power supply portion comprises a first motor with an RPM that varies with the differential pressure signal,
   the power transmission portion comprises a first upper pulley and a first lower pulley that are arranged spaced apart from each other in an upper end and a lower end, and a first rotation member wound around the first upper pulley and the first lower pulley and rotated by the first motor in one direction, and the moving portion is coupled to the first rotation member and moves in the vertical direction when the first rotation member is rotated.

2. The level indicating device for a tank of claim 1, wherein the beam irradiation portion is configured to irradiate a laser beam.

3. A level indicating device for a tank, the level indicating device comprising:

a differential pressure type level gauge configured to measure a level of a fluid in the tank on the basis of a pressure according to the level of the fluid in the tank; and a level indicator configured to indicate the level of the fluid by moving in a vertical direction according to a differential pressure signal measured by the differential pressure type level gauge, wherein the level indicating device further comprising a cleaning device coupled to a front surface of the level indicator and cleaning the front surface of the level indicator, wherein the cleaning device comprises:
a guide rod provided in the vertical direction;
an elevation block coupled to the guide rod and moving in the vertical direction;
a cleaning portion coupled to the elevation block and contacting and cleaning the front surface of the level indicator while the elevation block is moving up and down; and
a driving portion configured to supply power to move the elevation block up and down.

4. The level indicating device for a tank of claim 3, wherein the elevation block is moved up and down in a preset certain time interval.

5. A level indicating device for a tank, the level indicating device comprising:

a differential pressure type level gauge configured to measure a level of a fluid in the tank on the basis of a pressure according to the level of the fluid in the tank; and a level indicator configured to indicate the level of the fluid by moving in a vertical direction according to a differential pressure signal measured by the differential pressure type level gauge, wherein the level indicator comprises:
a power supply portion configured to supply power according to the differential pressure signal;
a power transmission portion configured to transmit the power via the power supply portion;
a moving portion configured to receive the power from the power transmission portion and move to a position corresponding to the level of the fluid; and
a beam irradiation portion coupled to the moving portion and configured to irradiate light to the level of the fluid, wherein the level indicating device further comprising:
a beam guide portion configured to adjust a range of irradiation of the light, wherein the beam guide portion comprises a combining portion having an exit hole formed therein, from which the light exits, and coupled to a front surface of the beam irradiation portion, and
a beam adjustment portion protruding from both edges of the combining portion and forming an adjustable angle with the combining portion.

* * * * *